(12) United States Patent
Willis et al.

(10) Patent No.: US 6,379,450 B1
(45) Date of Patent: Apr. 30, 2002

(54) PROCESS FOR PRODUCING β-PHASE COPPER PHTHALOCYANINE PIGMENT

(75) Inventors: Michael J. Willis, Cincinnati; Paul A. Merchak, Loveland; Russell J. Schwartz; Karii L. MacCune, both of Cincinnati, all of OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/520,482

(22) Filed: Mar. 8, 2000

(51) Int. Cl.$^7$ ................................................ C09B 47/04
(52) U.S. Cl. ....................... 106/412; 106/410; 540/140; 540/141
(58) Field of Search ................................ 106/412, 410; 540/140, 141

(56) References Cited

U.S. PATENT DOCUMENTS

| | | | |
|---|---|---|---|
| 3,523,030 A | 8/1970 | Malin et al. | 106/288 |
| 3,849,150 A | 11/1974 | Schrempp et al. | 106/228 Q |
| 4,024,154 A | 5/1977 | Jackson | 260/314.5 |
| 4,141,904 A * | 2/1979 | Cabut et al. | 540/123 |
| 4,158,572 A | 6/1979 | Blackburn et al. | 106/288 Q |
| 4,371,643 A | 2/1983 | Thomas | 524/88 |
| 4,451,654 A | 5/1984 | Graser et al. | 546/34 |
| 5,175,282 A | 12/1992 | Roth et al. | 540/141 |
| 5,194,088 A | 3/1993 | Babler et al. | 106/412 |
| 5,229,508 A * | 7/1993 | Ikegaya et al. | 540/141 |
| 5,284,511 A | 2/1994 | Rolf et al. | 106/410 |
| 5,296,033 A | 3/1994 | Dietz et al. | 106/412 |
| 5,492,563 A * | 2/1996 | Urban | 106/412 |
| 5,626,662 A | 5/1997 | Urban | 106/497 |

FOREIGN PATENT DOCUMENTS

| | | | |
|---|---|---|---|
| EP | 0 221 466 | 5/1987 | C09B/67/04 |
| GB | 2039290 A | 8/1990 | C09B/67/16 |
| JP | 7-310024 | * 11/1995 | |

* cited by examiner

*Primary Examiner*—Anthony Green
(74) *Attorney, Agent, or Firm*—Sidney Persley

(57) ABSTRACT

A process for the preparation of β phase copper phthalocyanine pigment which includes dry grinding crude copper phthalocyanine in the absence of a grinding aid to obtain a crude mill; and conditioning the crude mill in about 5 to 50 wt. % based on the weight of the crude mill of a conditioning solvent.

11 Claims, No Drawings

PROCESS FOR PRODUCING β-PHASE COPPER PHTHALOCYANINE PIGMENT

FIELD OF THE INVENTION

This invention relates to a process for converting crude copper phthalocyanine into β-phase copper phthalocyanine pigment.

BACKGROUND OF THE INVENTION

Crude copper phthalocyanine (CuPc) pigment is non- or partially-substituted and when obtained directly from solvent or non-solvent synthetic routes is generally in a coarse crude form that is non-pigmentary, tinctorially weak, and requires further processing. By "crude" we mean a pigment obtained in a highly aggregated form having a particle size not suitable for use as a pigment, or pigment which has been milled to produce a product which is also aggregated and has a broader particle size distribution than that obtained from synthesis but is still unsuitable for use as a pigment or an industrial colorant for inks and/or coatings. This processing involves comminution (e.g. milling) to reduce the particle size, and/or further conditioning to obtain pigmentary quality. Several conventional primary comminution processes include, for example, dissolving or swelling crude pigment in different concentrations of sulfuric acid, precipitating it in water, and kneading it in combination with milling aids (i.e., inorganic salts) and solvents. Wet milling or dry milling are typically carried out for example in a ball mill with or without milling aids. When the primary route of comminution is by dry grinding, typical a conditioning process follows and may include: slurrying or suspending the milled-crude in an aqueous, aqueous-organic or organic solvent and heating and/or wet-milling, or mixing in a dense mass state with water-soluble solvent and inorganic salt to provide pigmentary quality material.

Pigment processing by wet and dry milling of crude organic pigments is described in the prior art. They often require conditioning the wet or dry milled crude pigment in a slurry, at an elevated temperature, with large amounts of water, solvent, surfactants and/or combinations of these along with other additives. The fluids used are typically used in the range of up to 100 wt. % or more of the milled crude.

It is desirable, however, to minimize the amount of water, organic salts, solvent and additives used during pigment synthesis process since most of these compounds or solvents must be removed in order to isolate the CuPc pigment. This can be time-consuming and thus expensive. Furthermore, using less organic solvents is preferred because of environmental considerations. Lower process temperatures are also preferred as this helps to minimize crystallite growth and this is important since larger pigment crystals lose color strength and are more opaque.

SUMMARY OF THE INVENTION

The present invention relates to a dry process for producing β-phase CuPc pigment and with excellent color value. Specifically, the β-phase CuPc pigment is prepared by grinding crude CuPc in the absence of grinding aids then dry conditioning in a conditioning solvent that is present in low amounts.

DETAILED DESCRIPTION OF THE INVENTION

It has now been found that pigmentary grade phase CuPc can be produced by dry grinding crude CuPc in the absence of grinding aids to obtain a crude mill and subsequently conditioning the crude mill in the presence of a low amount of conditioning solvent.

The first process step of the present invention involves dry milling, in an industrial grinding mill such as a ball mill, attritor, or vibratory mill, the crude. No grinding aids (i.e. inorganic salts) are present during milling. The milling conditions, which include the grinding media size, shape and composition, milling time and temperature, are mill dependent. The aggregated product (e.g. crude mill) will be an $\alpha{:}\beta$ mix mostly of the β-phase and have, as determined by X-Ray diffraction, i.e. from 0:100 to 80:20. More preferably the target $\alpha{:}\beta$ ratio is from 50:50 to 65:35 when no milling solvents are present and from 0:100 to 65:35 when milling solvents are used. The crude mill will have a surface area, of less than 10 $m^2/gm$ and consists of primary particles of less than 0.10 microns in size. The dry milling step may also be performed in the presence of low amounts of milling solvent and other additives.

Milling solvents may be used in amounts less than 50% preferably 10% of the weight of the crude CuPc, and at combinations of these along with other additives. The fluids typically are employed in amounts ranging up to 100% by weight or more of the crude mill.

The second process step of the present invention involves conditioning the crude mill, for example, in an industrial mixer to a free-flowing granular powder form with a conditioning solvent and optionally a dispersant or other additive to form. The dry magma which is formed shall contain about 25 to 95 wt. %, preferably about 45 to 65 wt. % of the crude mill; conditioning solvent weighing about 5 to 50 wt. %, preferably about 20 to 40 wt. % of the crude mill; dispersant being about 0 to 20 wt. %, preferably about 5 to 15 wt. % of the crude mill; and additives (such as resins or waxes) being about 0 to 50 wt. % of the crude mill. The crude mill is then conditioned and/or recrystallized by mixing under shearing for 1 to 15 hours, preferably for 2 to 8 hours, at a temperature of less than about 120° C., more preferably between about 80 to 110° C., and most preferably between about 90 to 100° C. in an industrial mixer.

Industrial mixers include but are not limited to a sigma or disperser blade mixer, a double planetary mixer, a vacuum drier with or without rotating chopper blades, a conventional dough mixer, a mix muller, an extruder or any mixing or grinding unit that is capable of applying a mechanical shear or mixing.

Milling and conditioning solvents are used here to describe organic materials that are non-solid at the conditioning temperature and pressure. The conditioning solvent may be of a recrystallizing type or a non-crystallizing type, with the recrystallizing type preferred when the crude mill contains α-form CuPc that needs to be recrystallized to β-form CuPc. When all form CuPc crude mill is obtained either type of solvents may be used. Incorporated into the scope of this invention is that any combination of the two types, or two or more of either types may be used, though a single solvent is preferred.

Preferably, the conditioning solvent is selected from the group consisting of glycols, fatty acids, plasticizers (such as dioctyl phthalate and nonylphenolethoxylates), hydrocarbon petroleum distillates, and alkylene carbonates. More preferably, the conditioning solvent is a glycol such as a glycol selected from the group consisting of diethylene glycol, dipropylene glycol, polyethylene glycol, monoethylene glycol monoether, triethylene glycol monoether, and glycol ether esters (such as butyl carbitol acetate).

Pigment dispersing agents and other conventional additives may be added before, during or after the dry grinding, conditioning or isolation processing steps. They help improve wetting, dispersibility, dispersion stability and coloristic properties (strength, gloss, transparency, etc.) of the CuPc pigment.

Examples of dispersants include but are not limited to CuPc-$(X)_n$, wherein n is an integer from 1 to 6; X is selected from the group consisting of $SO_3^-M^+$, $SO_2R$, and $CH_2Y$; M is selected from the group consisting of hydrogen, primary, secondary, tertiary, or quaternary amine; R is selected from the group consisting of metal ion, dimethyl amino propylamine, phthalimide, and amine terminated polyalkylene oxide; and Y is selected from the group consisting of $NH_2$, phthalimide, and o-carboxy benzamide.

Examples of conditioning additives include but are not limited to various types of rosins, polymeric resins, waxes, plasticizers, crystal growth inhibitors and extenders.

The resulting CuPC pigment product can be further processed or incorporated directly into, for example, an ink formulation to provide excellent color value.

An optional third process step can be employed in the present invention when it is desirable to isolate the pigmentary CuPC product. It involves isolation of the pigment by removing the milling or conditioning solvents and can be performed by distillation, filtration or by other methods known to those ordinary skill in the field of solvent removal. The presscake obtained from using a conventional filter press typically employed at the end of a solvent removal step may be dried and ground by conventional methods known in the field. However, solvent removal may be avoided altogether if the milling and conditioning solvent, dispersant and additives have specifically chosen to remain in the product as having compatibility with the final application of the product as a colorant.

EXAMPLE 1

Conventional crude CuPc (12 lbs.) is dry milled for 24 hours in a ball mill containing 100 lbs. of 2 inch diameter steel balls at 70° C. The aggregated mill crude was analyzed and determined to be composed of a 60:40 α:β mix of CuPc, composed of primary particles averaging 0.04 microns in size.

The crude mill (12 lbs.) was then transferred to the mix Muller (mixer) in which the diethylene glycol (3.6 lbs.) was added while mixing. Steam was applied to the heating jacket of the mixer to keep the temperature during the mixing cycle at 100° C. After a 2 hour mixing cycle at 100° C., CUPc-$SO_2$-primary amine (0.7 lbs.) was added. The resulting product was mixed for 3 hours at about 100° C. then washed with water (5 parts) and the pH was adjusted with hydrochloride to 1.5. The resulting slurry was stirred for 2 hours at 85° C., filtered and washed with water to a pH of about 7. The resulting presscake was dried and determined to have excellent color value in a nitrocellulose packaging ink systems.

EXAMPLE 2

Conventional crude CuPc (12 lbs.) was dry milled for 24 hours in ball mill, containing 100 lbs. of 2 inch diameter steel balls at 70° C. The aggregated crude mill was determined to be composed of a 60:40 α:β mix of CuPc composed of primary particles averaging from 0.02 to 0.04 microns in size.

The crude mill (12 lbs.) was then transferred to a Mix Muller in which hydrocarbon petroleum distillate (3.6 MagieSol® 47) was added while mixing. Steam was applied to the heating jacket of the mixer for 5 hours to keep the temperature at about 100° C. The resulting magma was dispersed in an offset oil ink systems and offered excellent color strength.

EXAMPLE 3

Crude CuPc was dry milled in a ball mill for 8 hours. This material was then transferred to a stainless steel kneader (800 mil capacity) in which diethylene glycol (105 grams) was added while mixing. Steam was applied to the kneader to heat the jacket to keep the temperature at 100° C. The resulting magma was added to water (2 liters) and the pH was adjusted with hydrochloride to 1.5. The slurry was stirred for 2 hours at 85° C., filtered and washed with water to a pH of about 7. The resulting presscake was used as an aqueous dispersions and was reported to have excellent color strength value.

The invention has been described in terms of preferred embodiments thereof, but is more broadly applicable as will be understood by those skilled in the art. The scope of the invention is only limited by the following claims.

What is claimed is:

1. A process for preparing β copper phthalocyanine pigment comprising;
    (a) dry grinding crude copper phthalocyanine in the absence of a grinding aid to obtain a crude mill; and
    (b) conditioning the resulting crude mill in conditioning solvent present in an amount ranging from about 5 to 50 wt % based on the weight of the crude mill at a temperature sufficient for producing pigment, thereby forming a dry magma.

2. The process of claim 1 wherein the □ copper phthalocyanine pigment is separated from the conditioning solvent.

3. The process of claim 1 wherein the amount of the conditioning solvent is about 20 to 40 wt. %.

4. The process of claim 3 wherein the conditioning solvent is selected from the group consisting of glycols, fatty acids, plasticizers, amphoteric surfactants, hydrocarbon petroleum distillates, and alkylene carbonates.

5. The process of claim 4 wherein the conditioning solvent is a glycol.

6. The process of claim 5 wherein the glycol is selected from the group consisting of diethylene glycol, dipropylene glycol, polyethylene glycol, monoethylene glycol monoether, triethylene glycol monoether and glycol ether esters.

7. The process of claim 1 wherein the conditioning is carried out at a temperature less than 120° C.

8. The process of claim 7 wherein the conditioning is carried out between about 80 and about 110° C.

9. The process of claim 1 further comprising adding a dispersant or conditioning additive during the conditioning step.

10. The process of claim 9 wherein the dispersant is CuPc-$(X)_n$, wherein n is an integer from 1 to 6; X is selected from the group consisting of $SO_3^-M^+$, $SO_2R$, and $CH_2Y$, M is selected from the group consisting of hydrogen and primary, secondary, tertiary, or quaternary amine; R is selected from the group consisting of metal ion, dimethyl amino propylamine, phthalimide, and amine terminated polyalkylene oxide; and Y is selected from the group consisting of $NH_2$, phthalimide, and o-carboxy benzamide.

11. The process of claim 9 wherein the conditioning additive is selected from the group consisting of rosins, polymeric resins, waxes, plasticizers, crystal growth inhibitors, and extenders.

* * * * *

UNITED STATES PATENT AND TRADEMARK OFFICE
CERTIFICATE OF CORRECTION

PATENT NO. : 6,379,450 B1
DATED : April 30, 2002
INVENTOR(S) : Willis et al.

It is certified that error appears in the above-identified patent and that said Letters Patent is hereby corrected as shown below:

Title page,
Item [57], all three occurrences of "crude mill" should read -- milled crude --.

Column 2,
Line 3, "grade phase" should read -- grade β phase --;
Lines 6, 21, 38, 39, 42, 43, 44, 61 and 63, "crude mill" should read -- milled crude --;
Line 63, "all form" should read -- all β form --.

Column 3,
Line 55, "mill crude" should read -- milled crude --;
Line 59, "crude mill" should read -- milled crude --.

Column 4,
Lines 9 and 14, "crude mill" should read -- milled crude --.
Lines 44 and 45, "crude mill" should read -- milled crude --;
Line 50, "the ☐ copper" should read -- the β copper --.

Signed and Sealed this

Thirtieth Day of July, 2002

Attest:

JAMES E. ROGAN
Attesting Officer
Director of the United States Patent and Trademark Office